US012320282B2

(12) United States Patent
Inden et al.

(10) Patent No.: US 12,320,282 B2
(45) Date of Patent: Jun. 3, 2025

(54) CYLINDER HEAD

(71) Applicant: DEUTZ Aktiengesellschaft, Cologne (DE)

(72) Inventors: Alfred Inden, Pulheim (DE); Daniel Bertram, Bergheim (DE); Gerald Leyh, Michelfeld (DE)

(73) Assignee: Deutz Aktiengesellschaft, Cologne (DE)

( * ) Notice: Subject to any disclaimer, the term of this patent is extended or adjusted under 35 U.S.C. 154(b) by 301 days.

(21) Appl. No.: 17/423,486

(22) PCT Filed: Jan. 8, 2020

(86) PCT No.: PCT/EP2020/000004
§ 371 (c)(1),
(2) Date: Jul. 16, 2021

(87) PCT Pub. No.: WO2020/151903
PCT Pub. Date: Jul. 30, 2020

(65) Prior Publication Data
US 2022/0074328 A1 Mar. 10, 2022

(30) Foreign Application Priority Data
Jan. 23, 2019 (DE) ..................... 10 2019 000 498.1

(51) Int. Cl.
*F01M 13/04* (2006.01)
*F02F 1/24* (2006.01)
*F02F 7/00* (2006.01)

(52) U.S. Cl.
CPC ........... *F01M 13/0416* (2013.01); *F02F 1/24* (2013.01); *F02F 7/0004* (2013.01);
(Continued)

(58) Field of Classification Search
CPC ....... F01M 13/0416; F01M 2013/0433; F01M 2013/0461; F02F 1/24; F02F 7/0004; F02F 7/0021
See application file for complete search history.

(56) References Cited

U.S. PATENT DOCUMENTS

| | | | | |
|---|---|---|---|---|
| 4,459,966 A | | 7/1984 | Sakano et al. | |
| 4,593,659 A | * | 6/1986 | Wells ...................... | F02F 7/006 123/90.38 |

(Continued)

FOREIGN PATENT DOCUMENTS

| | | |
|---|---|---|
| DE | 423791 | 1/1926 |
| DE | 1476099 A | 3/1969 |

(Continued)

OTHER PUBLICATIONS

Machine Translation of WO2009008427A1, 2009 PDF File Name: "WO2009008427A1_Machine_Translation.pdf".*

(Continued)

*Primary Examiner* — Grant Moubry
*Assistant Examiner* — Ruben Picon-Feliciano
(74) *Attorney, Agent, or Firm* — Davidson Kappel LLC

(57) ABSTRACT

An internal combustion engine-includes at least one cylinder crankcase, at least one cylinder head (2) including at least one valve cover (1), charge-cycle valves, a valve train-assembly, injectors (3), an injector cable harness, injection lines (4), a fuel rail (5) and a pre-separator for separating the oil aerosols present in the blow-by volume flow being situated in the cylinder head (2).

20 Claims, 2 Drawing Sheets

(52) U.S. Cl.
CPC ... *F02F 7/0021* (2013.01); *F01M 2013/0433* (2013.01); *F01M 2013/0461* (2013.01)

(56) References Cited

U.S. PATENT DOCUMENTS

| | | | | | |
|---|---|---|---|---|---|
| 4,928,641 | A | | 5/1990 | Niizato et al. | |
| 5,080,082 | A | | 1/1992 | Mueller et al. | |
| 5,094,194 | A | * | 3/1992 | Rush, II | F02M 35/10222 123/184.42 |
| 5,138,985 | A | | 8/1992 | Szodfridt et al. | |
| 5,950,602 | A | | 9/1999 | Shinohara | |
| 6,076,505 | A | * | 6/2000 | Guggenmos | F02F 1/242 123/456 |
| 6,213,107 | B1 | | 4/2001 | Gyllenstaedt | |
| 7,434,572 | B2 | | 10/2008 | Huetter et al. | |
| 8,011,338 | B2 | | 9/2011 | Narayanakumar | |
| 8,091,533 | B2 | | 1/2012 | Ng et al. | |
| 9,080,478 | B2 | | 7/2015 | Elsner et al. | |
| 10,767,524 | B2 | | 9/2020 | Kashiwabara et al. | |
| 2002/0007819 | A1 | * | 1/2002 | Nitta | F02M 55/005 123/456 |
| 2007/0272176 | A1 | | 11/2007 | Wagner et al. | |
| 2016/0177791 | A1 | | 6/2016 | Kira et al. | |
| 2020/0108340 | A1 | * | 4/2020 | Fenske | B01D 45/16 |

FOREIGN PATENT DOCUMENTS

| | | | | | |
|---|---|---|---|---|---|
| DE | 2103061 | | | 8/1971 | |
| DE | 4024057 | C1 | | 9/1991 | |
| DE | 4017074 | A1 | | 11/1991 | |
| DE | 3874112 | T2 | | 12/1992 | |
| DE | 4214800 | A1 | | 11/1993 | |
| DE | 4239108 | A1 | | 5/1994 | |
| DE | 69024117 | T2 | | 5/1996 | |
| DE | 19845942 | A1 | | 4/2000 | |
| DE | 19914166 | | | 10/2000 | |
| DE | 19742602 | C2 | | 4/2001 | |
| DE | 10125404 | A1 | * | 11/2002 | B01D 45/08 |
| DE | 102005048331 | A1 | | 4/2007 | |
| DE | 102006012611 | A1 | | 9/2007 | |
| DE | 102010009687 | A1 | | 10/2010 | |
| DE | 102010004805 | A1 | | 7/2011 | |
| DE | 102012206885 | A1 | * | 11/2012 | F02M 25/06 |
| DE | 102013222765 | A1 | * | 5/2014 | B60R 13/0884 |
| DE | 102014200791 | A1 | | 7/2014 | |
| DE | 102013016722 | A1 | | 4/2015 | |
| DE | 102015016283 | A1 | | 6/2016 | |
| DE | 102016205678 | A1 | * | 10/2016 | B60Y 17/02 |
| DE | 102018116622 | A1 | | 1/2019 | |
| EP | 212981 | A2 | | 3/1987 | |
| EP | 213787 | A1 | | 3/1987 | |
| EP | 602398 | A1 | * | 6/1994 | F01M 13/0405 |
| EP | 744531 | A1 | | 11/1996 | |
| EP | 0654589 | B1 | | 12/1997 | |
| EP | 1094204 | A1 | | 4/2001 | |
| EP | 1722075 | A1 | * | 11/2006 | F01L 1/0532 |
| GB | 2141780 | A | | 1/1985 | |
| JP | H06123212 | A | | 5/1994 | |
| JP | 2000038915 | A | | 2/2000 | |
| JP | 2000248919 | A | | 9/2000 | |
| JP | 2003172202 | A | | 6/2003 | |
| JP | 2016056709 | A | | 4/2016 | |
| WO | WO1998049432 | A1 | | 11/1998 | |
| WO | WO-2009008427 | A1 | * | 1/2009 | F01M 13/022 |
| WO | WO 2009116063 | A2 | | 9/2009 | |
| WO | WO2010109483 | A2 | | 9/2010 | |
| WO | WO-2015087105 | A1 | * | 6/2015 | F02F 1/24 |
| WO | WO-2016125472 | A1 | * | 8/2016 | F02B 77/11 |

OTHER PUBLICATIONS

Machine Translation of DE-10125404-A1 PDF File Name: “DE10125404A1_Machine_Translation.pdf”.*

Machine Translation of EP1722075A1 PDF File Name: “EP1722075A1_Machine_Translation.pdf”.*

Machine Translation of WO2016125472A1 PDF File Name: “WO2016125472A1_Machine_Translation.pdf”.*

Machine Translation of DE 102012206885 A1 PDF File Name: “DE102012206885A1_Machine_Translation.pdf”.*

Machine Translation of DE102016205678A1 PDF File Name: “DE102016205678A1_Machine_Translation.pdf”.*

Machine Translation of DE102013222765A1 PDF File Name: “DE102013222765A1_Machine_Translation.pdf”.*

Machine Translation of EP0602398A1 PDF File Name: “EP0602398A1_Machine_Translation.pdf”.*

Machine Translation of DE102013222765A1 PDF File Name: “DE102013222765A1_Machine_Translation.pdf” (Year: 2014).*

International Search Report for PCT/EP2020-00004, dated Apr. 14, 2020.

* cited by examiner

CYLINDER HEAD

The present disclosure relates to an internal combustion engine including a pre-separation chamber for the oil aerosol separation.

BACKGROUND

Present engines show an ever greater power density, with simultaneously further increasing requirements with regard to the emission values. This, on the one hand, calls for minimal engine dimensions, but, on the other hand, also for the use of efficient technologies as well as the integration of different functions into existing components.

In engine developments, the crankcase ventilation must accordingly be given consideration.

The crankcase ventilation is used to separate oil-containing components (aerosols) from the, by virtue of the system, inevitable leakage gas volume which reach the crankcase via piston rings, the exhaust gas turbocharger seal as well as valve-stem seals, and from there have to be discharged via corresponding oil separation devices.

Oil separators of internal combustion engines have the task of purifying the oil/gas mixture present in the crankcase by separating the oil droplets from this mixture and recirculating them into the sump of the oil pan, while they conduct gases into the intake area. For this purpose, the oil separator is connected at its inlet to the crankcase, and at its outlet to the intake area. An oil separator of the above-described kind is known from DE 4239108 A1, for example. For recirculating the separated oil, recirculation lines are provided there, which exit into the sump of the oil pan below the oil level. DE 4017074 A1 describes a pressure control valve for the crankcase ventilation at an internal combustion engine, this pressure control valve being used in combination with a filling port for engine oil and an oil dipstick. This combination is characterized in that it is space-saving and centrally connects all components which are related to the oil supply and monitoring of an internal combustion engine. This combination is furthermore characterized in that only a single connection is required at the engine block, through which the oil to be added or the oil recirculating from the pressure control valve is supplied to the oil pan and which additionally accommodates the oil dipstick.

Furthermore, it is known from WO 98/49432 A1 to separate oil droplets of an oil droplet/gas mixture via the centrifugal action of a gear wheel rotating in a housing, a tube aligned with the rotation axis of the gear wheel discharging the purified gases from the housing.

An oil separator situated at a cylinder head cover is known from JP 2000-38915 A, on whose horizontal bottom surface three L-shaped angles are situated, the rear sides of the perpendicular L beams being aligned with drain openings into the bottom surface. A tube is inserted into the housing at the ceiling of the housing, through which the gases freed of oil droplets escape via a valve.

DE 2103061 shows a device for recirculating gases from the engine housing of an internal combustion engine into its gas introduction system.

An internal combustion engine including a device for ventilating the crankcase, in particular, in the case of motorcycles, is known from DE 423791, in which the soiling of the engine or of the clothing of the driver as well as oil losses are to be precluded. In the case of turbocharged engines, whose oil-containing gas is supplied upstream from the turbine, the risk in the case of highly supercharged engines is that varnishings occur due to the high temperatures in the turbine, which may cause damage to the turbocharger. For this reason, the option of using an open crankcase ventilation is taken advantage of in this engine type. The disadvantage here is that this collection container has to be maintained. In the process, the crankcase gases are discharged to the outside. As described above, these gases, despite pre-separation, still include oil, and oil may thus reach the outside, which is also disadvantageous.

DE 19914166 shows a rotatorily operating oil separator for purifying the gases included in the crankcase of an internal combustion engine, in particular, a self-igniting internal combustion engine.

Crankcase ventilation gas, or also referred to as blow-by gas, hereafter crankcase gas, is gas which during engine operation flows past the piston rings into the crankcase. The absorbed oil has to be removed from this crankcase gas, and the purified crankcase gas is then supplied, in particular, to the combustion air. Today, the oil separation from the crankcase gases takes place predominantly with the aid of separators, which are made up of a knitted fabric made of fibers, or with the aid of jet deflections at deflector plates, or a combination of both methods. For future engines, the separation rates achievable with the aid of the existing separators are not effective enough. For this reason, micro-filters, possibly also as exchangeable filter systems, are used. However, these have the disadvantage that they, in terms of principle, operate at a high pressure differential, and thus result in leak-tightness problems at the engine.

SUMMARY

It is an object of the present disclosure to create an internal combustion engine which avoids the aforementioned disadvantages.

An internal combustion engine is provided, including at least one cylinder crankcase, at least one cylinder head including at least one valve cover, charge-cycle valves, a valve train-assembly, injectors, an injector cable harness, injection lines, a fuel rail and a pre-separator for separating the oil aerosols present in the blow-by volume flow being situated in the cylinder head.

An advantage is the compact design, the reduction of components, the combination of functions, the minimization of the number of components of the overall system, the reduction of leakage possibilities as a result of an interface reduction, the minimization of the installation complexity as a result of the installation and the reduction of lines in the engine periphery.

The cylinder head closes the combustion chamber toward the top. Intake and outlet valves, as well as injection nozzles or injectors, via which the fuel is injected into the combustion chamber, are situated in the cylinder head. Furthermore, the valve train-assembly, which is attached at the cylinder head and enclosed by the valve cover, and the actuation of the injectors via a corresponding cable harness are present. There is also the option of integrating both injection lines and the fuel rail into the cylinder head-valve cover functional group. Furthermore, devices or geometries for the pre-separation or fine separation of oil aerosols from the blow-by gas are situated in the cylinder head.

BRIEF DESCRIPTION OF THE DRAWINGS

Further important features and advantages are derived from the subclaims, from the drawing, and from the following description of one preferred exemplary embodiment based on the drawing.

DETAILED DESCRIPTION

Figure 1:
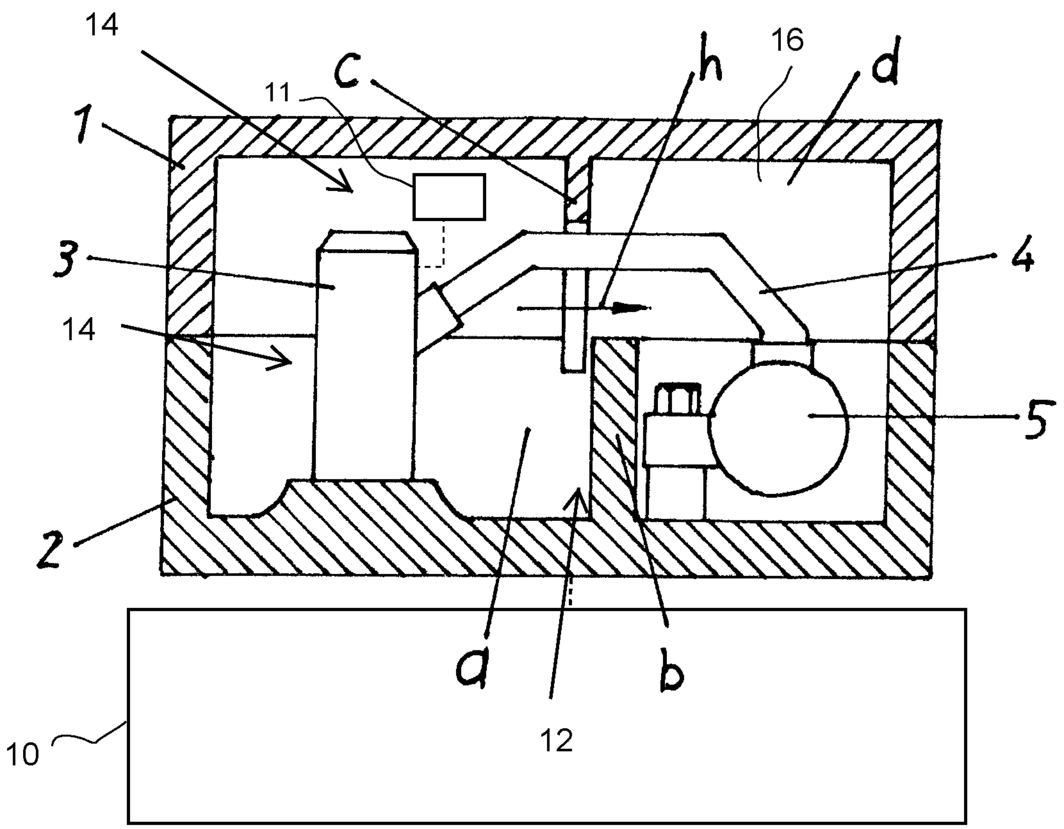
FIG. 1 shows a cross-section through the cylinder head of the internal combustion engine, including the valve cover.

The internal combustion engine includes a crankcase 10, a cylinder head 2 and a valve cover 1. Charge-cycle valves, a valve train-assembly, injectors 3, an injector cable harness 11 (shown schematically), injection lines 4, a fuel rail 5 and a pre-separator 12 for separating the oil aerosols present in the blow-by volume flow 14 are situated in cylinder head 2. The installation space d provided for the fuel rail is simultaneously used as the pre-separation chamber 16 for the oil aerosol separation, as is illustrated in FIG. 1. Installation space d surrounding fuel rail 5 serves as a calming space for the agglomeration or coagulation of the oil drops. The installation space d for the installation of the rail 5 is separated from valve train space a by a web b in the casting contour of the cylinder head 2 as well as a deflector plate c integrated into the valve cover. The gas transfer from valve train space a into fuel rail space or calming space d occurs via passages h necessary for feeding through high pressure lines 4 of injectors 3.

Figure 2:
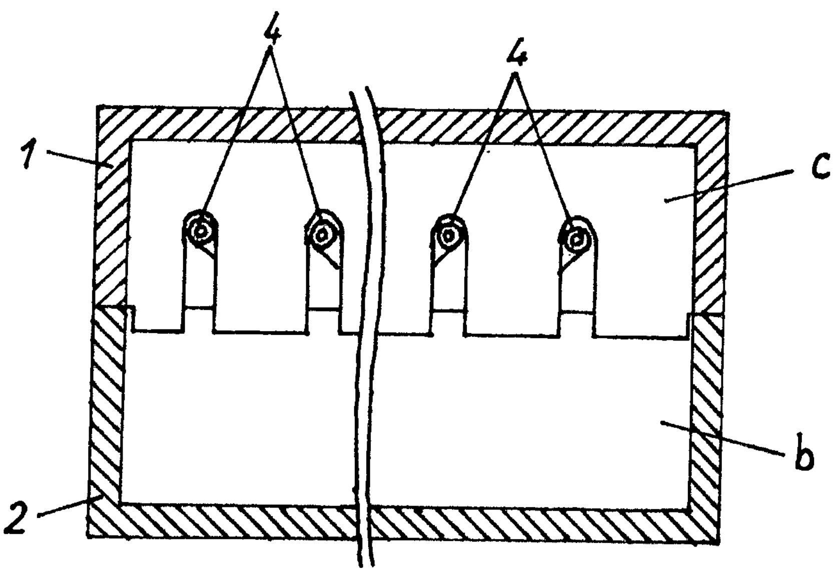
FIG. 2 shows a longitudinal section through the cylinder head from FIG. 1.

FIG. 2 shows a cylinder head 2 and a valve cover 1 of the internal combustion engine. Gas exchange valves, the valve train, injectors, an injector cable harness, injection lines 4, a fuel rail 5 and a pre-separator for separating the oil aerosols present in the blow-by volume flow are situated in cylinder head 2. The installation space provided for fuel rail 5 is simultaneously used as the pre-separation chamber for the oil aerosol separation, as is illustrated in FIG. 1. Installation space d surrounding fuel rail 5 serves as a calming space for the agglomeration or coagulation of the oil drops. The installation space d for the installation of the rail 5 is separated from valve train-assembly space a by a web b in the casting contour of the cylinder head as well as a deflector plate c integrated into the valve cover. The gas transfer from valve train-assembly space a into fuel rail space or calming space d occurs via passages h necessary for feeding through high pressure lines 4 of injectors 3.

Figure 3:
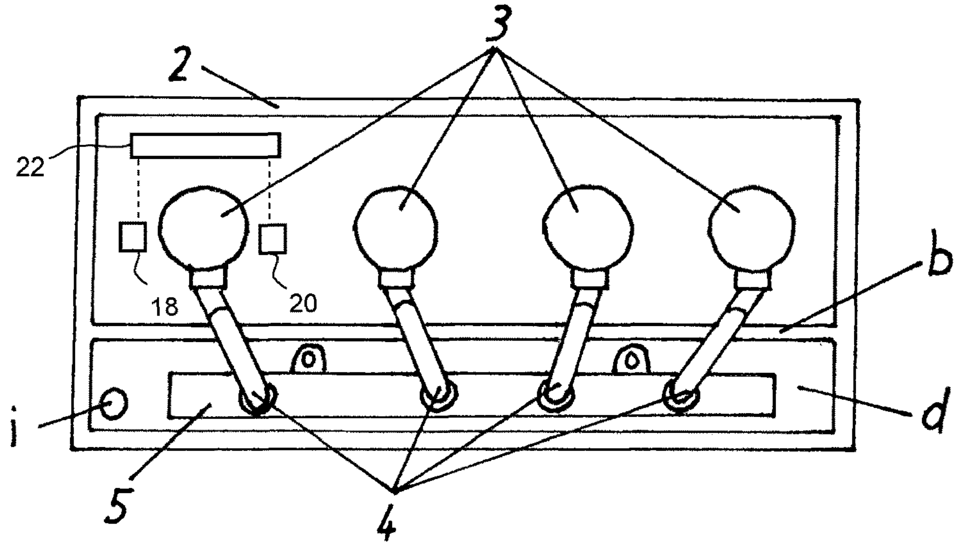
FIG. 3 shows a top view onto the cylinder head from FIGS. 1 and 2 without the valve cover.

FIG. 3 shows a top view onto cylinder head 2 from FIGS. 1 and 2 without the valve cover. Charge-cycle valves 18, 20 (a pair of which are shown schematically), the valve train-assembly 22 (shown schematically), injectors 3, an injector cable harness, injection lines 4, a fuel rail 5 and a pre-separator for separating the oil aerosols present in the blow-by volume flow are situated in cylinder head 2. The installation space provided for the fuel rail is simultaneously used as the pre-separation chamber for the oil aerosol separation, as is illustrated in FIG. 1. Installation space d surrounding fuel rail 5 serves as a calming space for the agglomeration or coagulation of the oil drops. The installation space for the installation of the rail is separated from the valve train-assembly space by a web b in the casting contour of the cylinder head as well as a deflector plate c integrated into the valve cover. The gas transfer from valve train-assembly space a into fuel rail space or calming space d occurs via passages h necessary for feeding through high pressure lines 4 of injectors 3. The separated oil quantity is discharged by a drainage option i through the crankcase into the oil pan.

Figure 4:
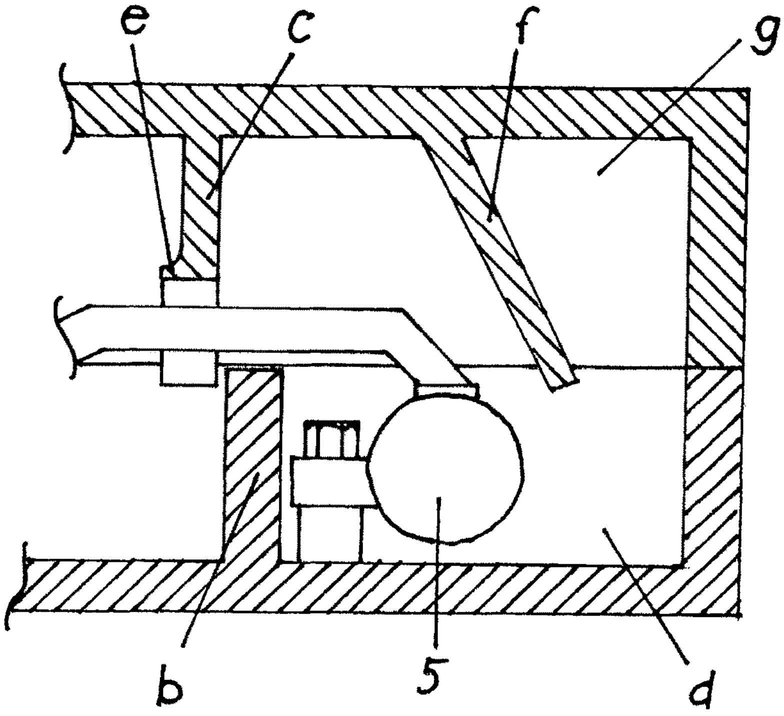
FIG. 4 shows an alternative cross-section through the cylinder head of the internal combustion engine.

FIG. 4 shows an internal combustion engine which includes a cylinder head 2 and a valve cover 1, Charge-cycle valves, a valve train-assembly, injectors, an injector cable harness, injection lines 4, a fuel rail 5 and a pre-separator for separating the oil aerosols present in the blow-by volume flow are situated in cylinder head 2. The installation space provided for the fuel rail is simultaneously used as the pre-separation chamber for the oil aerosol separation, as is illustrated in FIG. 1. Installation space d surrounding fuel rail 5 serves as a calming space for the agglomeration or coagulation of the oil drops. The installation space for the installation of the rail is separated from the valve train-assembly space by a web b in the casting contour of the cylinder head as well as a deflector plate c integrated into the valve cover. The gas transfer from valve train-assembly space a into fuel rail space or calming space d occurs via passages h which are necessary for feeding through high pressure lines 4 of injectors 3 and equipped with drip edges e for optimizing or reducing the oil entrainment into the calming space. An additional splashboard f, which delimits a separate pre-separation space g, protrudes into calming space d for further optimization of the pre-separation power.

LIST OF REFERENCE NUMERALS

1 Valve cover
2 Cylinder head of internal combustion engine
3 Injector
4 High pressure or injection line
5 Fuel rail
10 crankcase
11 injector cable harness
12 pre-separator
14 blow-by volume flow
16 pre-separation chamber
18, 20 charge-cycle valves
22 valve train-assembly
a Valve train-assembly space
b Web
c Deflector plate
d Calming space/installation space for the fuel rail
e Drip edge
f Splashboard
g Separate pre-separation chamber
h Passage for high pressure line
i Drainage passage

What is claimed is:

1. An internal combustion engine comprising:
a cylinder crankcase;
a cylinder head;
a valve cover;
wherein the cylinder head includes charge-cycle valves, a valve train-assembly, an injector, an injector cable harness, injection lines, a fuel rail, and a web;
wherein the valve cover includes a valve train space accommodating the valve train-assembly, a fuel rail space accommodating the fuel rail, and a deflector plate extending downward from a top of the valve cover,
wherein the web and the deflector plate are configured in a manner of a maze and separate the valve train space from the fuel rail space, and
wherein the deflector plate includes slots constituting unsealed passages from a valve train space into the fuel rail space allowing gas to transfer from the valve train space into the fuel rail space.

2. The internal combustion engine as recited in claim 1, wherein the internal combustion engine conducts oil aerosols from the cylinder crankcase into a blow-by volume flow that is between the cylinder head and the valve cover.

3. The internal combustion engine as recited in claim 2, wherein the cylinder head includes the charge-cycle valves and the injector cable harness in the blow-by volume flow.

4. A method for operating the internal combustion engine recited in claim 2 comprising:

separating, by a pre-separation chamber downstream of the deflector plate, the oil aerosols present in the blow-by volume flow.

5. The internal combustion engine as recited in claim 1, wherein an area including the fuel rail and provided as a pre-separation chamber for oil aerosol separation is situated between the cylinder head and the valve cover.

6. The internal combustion engine as recited in claim 1, wherein a drainage passage is situated in the cylinder head in such a way that separated oil is discharged through the cylinder crankcase into an oil pan.

7. The internal combustion engine as recited in claim 1, at least one of the web and the deflector plate includes drip edges.

8. The internal combustion engine as recited in claim 1, wherein an area in which the fuel rail is situated includes a splashboard, the splashboard delimiting a separate pre-separation space.

9. The internal combustion engine as recited in claim 1 wherein the web vertically overlaps the deflector plate, the deflector plate and the web separating a first space including the valve train-assembly from a second space including the fuel rail, the first space and second space defined by the valve cover and the cylinder head.

10. The internal combustion engine as recited in claim 1 further comprising a splashboard extending downward from a top of the valve cover in the fuel rail space.

11. The internal combustion engine as recited in claim 10 wherein the splashboard extends downward while angling away from the deflector plate.

12. The internal combustion engine as recited in claim 1 wherein the cylinder head includes a drainage passage for discharging separated oil in the fuel rail space.

13. The internal combustion engine as recited in claim 12 wherein the web is formed integrally with the cylinder head.

14. The internal combustion engine as recited in claim 13 wherein the injection lines pass through the deflector plate and over the web.

15. The internal combustion engine as recited in claim 14 wherein the injection lines pass through the slots in the deflector plate, the slots being vertically extending slots.

16. The internal combustion engine as recited in claim 15 wherein the web vertically overlaps the deflector plate such that a top edge of the web is vertically above a bottom edge of the deflector plate.

17. The internal combustion engine as recited in claim 13 wherein the web extends between a bottom wall and two side walls of the cylinder head.

18. The internal combustion engine as recited in claim 13 wherein the deflector plate extends between a top wall and two side walls of the valve cover.

19. The internal combustion engine as recited in claim 1 wherein a lower edge of the valve cover rests on top of and in contact with the cylinder head.

20. An internal combustion engine comprising:

a cylinder crankcase;

charge-cycle valves;

a valve train-assembly;

an injector;

an injector cable harness;

injection lines;

a fuel rail;

a cylinder head;

a valve cover, a lower edge of the valve cover rests on top of and in contact with the cylinder head, the cylinder head and the valve cover defining a space receiving the charge-cycle valves, the valve train-assembly, the injector, the injector cable harness, the injection lines, and the fuel rail; and a deflector plate extending downward from a top of the valve cover, the deflector plate including vertically-extending slots extending upward from a bottom edge of the deflector plate, the vertically-extending slots being horizontally spaced apart from each other, the deflector plate dividing the space defined by the cylinder head and the valve cover into a valve train space including the valve train-assembly and a fuel rail space including the fuel rail, the injection lines passing horizontally through the vertically-extending slots, the vertically-extending slots configured for surrounding the injection lines in a manner allowing gas to transfer from the valve train space into the fuel rail space around the injection lines through the vertically-extending slots.

* * * * *